United States Patent [19]

Samelson

[11] Patent Number: 4,941,812

[45] Date of Patent: * Jul. 17, 1990

[54] SPINNERET FOR PRODUCTION OF A HOLLOW FILAMENT WITHIN A HOLLOW FILAMENT COMPOSITE FIBER HAVING SPACING MEANS

[75] Inventor: Harry V. Samelson, Chadds Ford, Pa.

[73] Assignee: E. I. Du Pont de Nemours and Company, Wilmington, Del.

[*] Notice: The portion of the term of this patent subsequent to Jun. 6, 2006 has been disclaimed.

[21] Appl. No.: 193,710

[22] Filed: May 10, 1988

[51] Int. Cl.[5] .................. B28B 21/52; B29C 47/04; B29C 47/20

[52] U.S. Cl. .................. 425/131.5; 264/173; 264/177.14; 425/133.1; 425/382.2; 425/463

[58] Field of Search ............. 425/131.5, 133.1, 133.5, 425/382.2, 461, 462, 463, 464; 264/171, 173, 177.14, 177.13

[56] References Cited

U.S. PATENT DOCUMENTS

| | | |
|---|---|---|
| 2,879,544 | 3/1959 | Fleck .................. 425/133.1 |
| 2,974,613 | 3/1961 | Maldari .................. 425/462 |
| 2,988,420 | 6/1961 | Ryan, Jr. et al. ............ 425/131.5 |
| 2,999,296 | 9/1961 | Breen et al. .............. 264/177.14 |
| 3,585,684 | 12/1966 | McIntosh .................. 425/67 |
| 3,725,192 | 4/1973 | Satoshi Ando et al. ....... 425/131.5 |
| 4,344,907 | 8/1982 | Herrington .............. 425/462 |
| 4,385,886 | 5/1983 | Samelson .............. 425/464 |
| 4,484,877 | 11/1984 | Stucke et al. ............ 425/462 |
| 4,836,763 | 6/1989 | Broaddus .............. 425/131.5 |
| 4,850,847 | 7/1989 | Samelson .............. 425/382.2 |

FOREIGN PATENT DOCUMENTS

| | | |
|---|---|---|
| 45-15804 | 6/1970 | Japan .................. 264/171 |
| 47-9849 | 3/1972 | Japan .................. 264/171 |
| 55-21224 | 2/1980 | Japan .................. 425/461 |
| 55-90608 | 7/1980 | Japan .................. 264/177.14 |
| 60-182948 | 8/1985 | Japan . |
| 61-44022 | 3/1986 | Japan . |
| 61-46329 | 3/1986 | Japan . |
| 61-215710 | 9/1986 | Japan . |

OTHER PUBLICATIONS

Klare et al., "Synthetic Fibers from Polyamides, Technology and Chemistry", Akademie-Verlag, Berlin (1963).
Chang et al., "Glucose Oxidation in a Dual Hollow Fiber Bioreactor with a Silicone Tube Oxygenator", Biotechnology and Bioengineering, vol. XXIX, pp. 552–557 (1987).
Murakami, "Hollow Fiber Membranes for New Biotechnology", Sen i Gakkaishi 42, No. 6, pp. 243–248 (1986).

Primary Examiner—Jay H. Woo
Assistant Examiner—James P. Mackey

[57] ABSTRACT

The apparatus concerns hollow fibers and, more particularly, a hollow filament co-spun within another hollow filament composite fiber wherein spacing means is provided to separate the inner and outer filament walls and spinnerets for co-spinning such fibers.

4 Claims, 11 Drawing Sheets

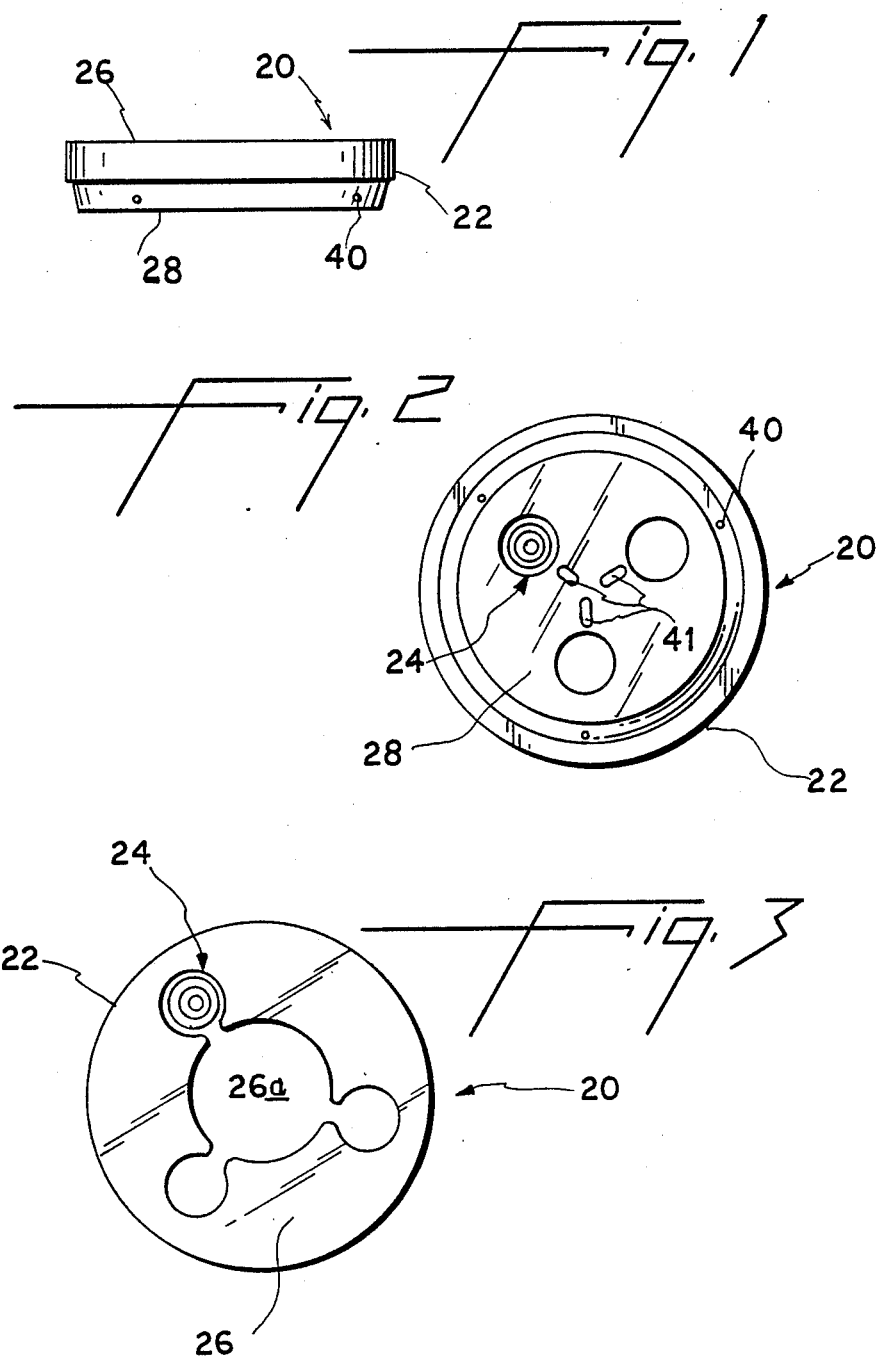

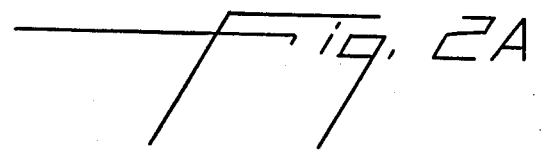
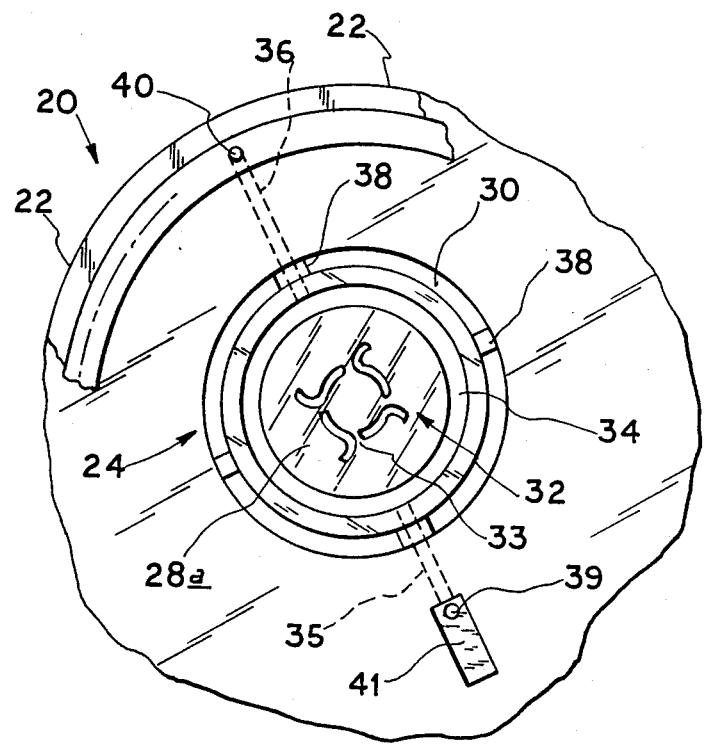

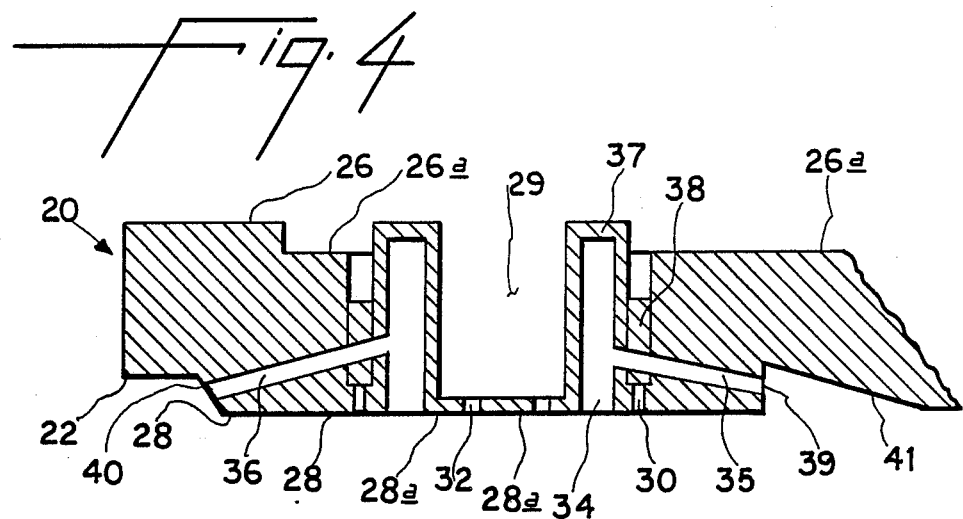
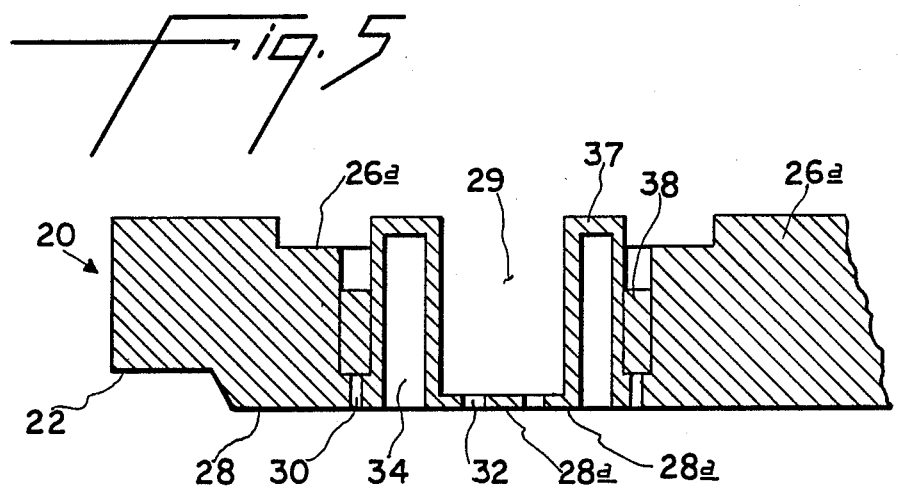
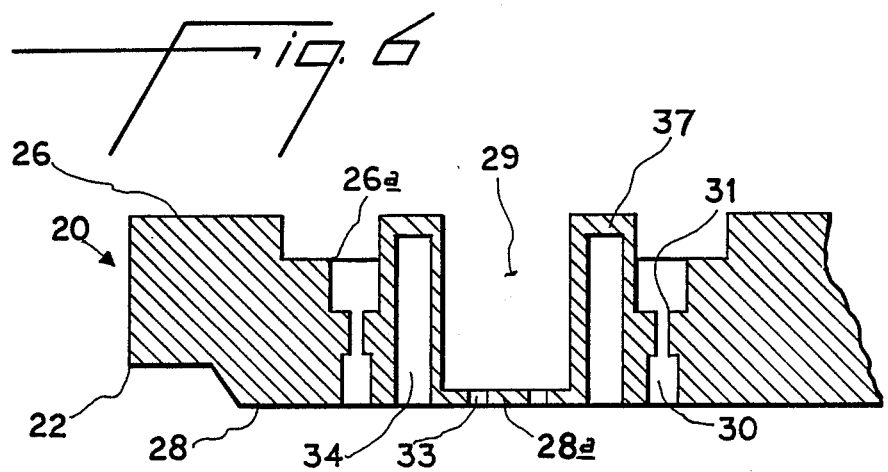

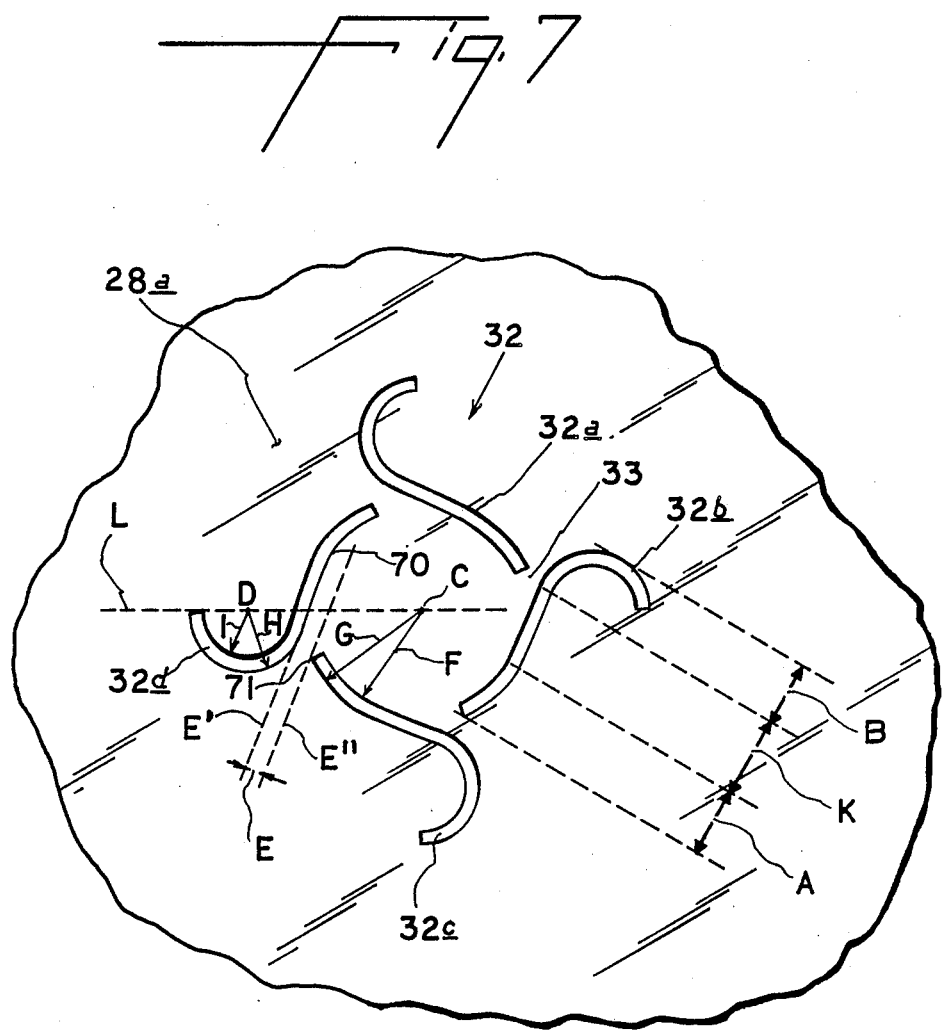

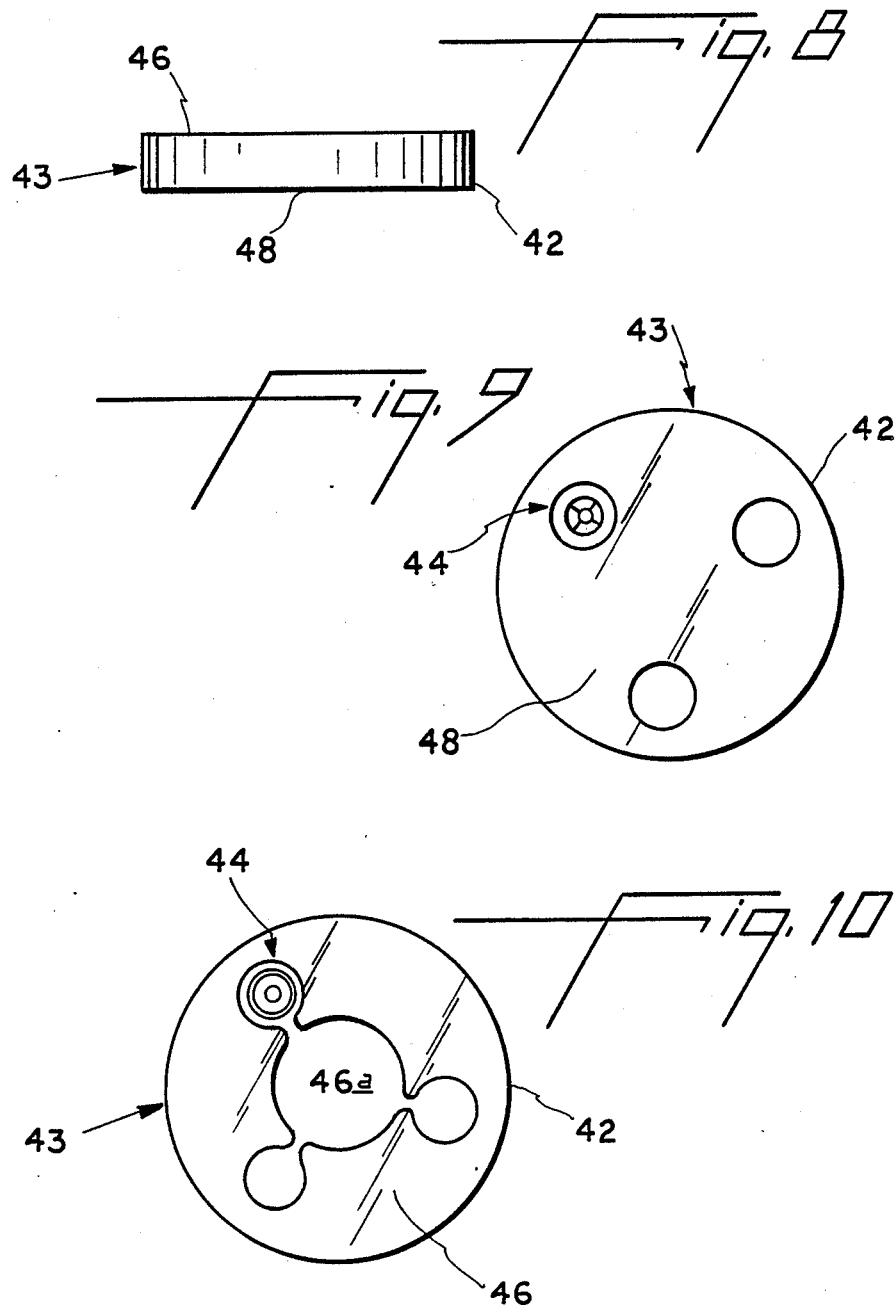

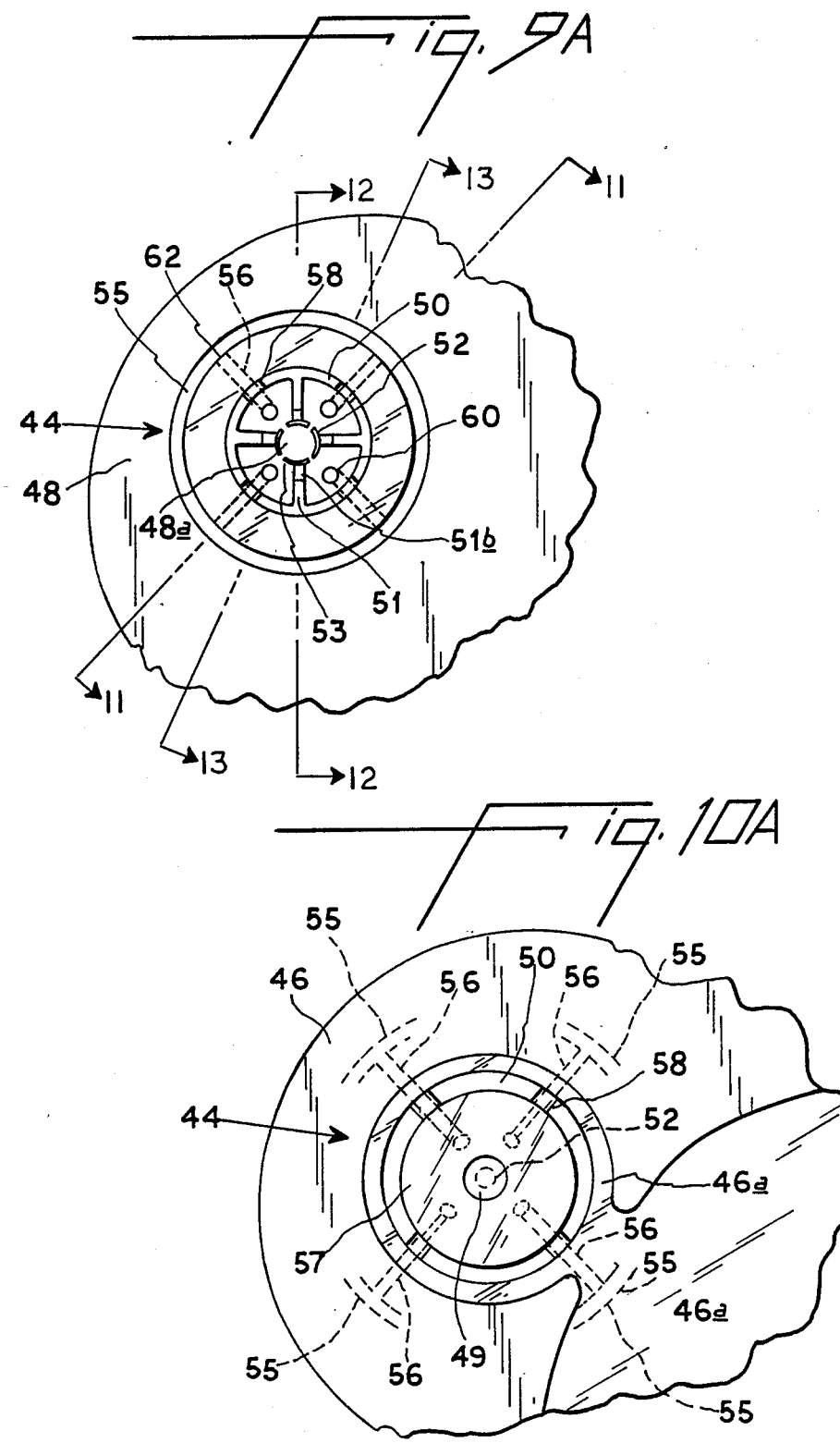

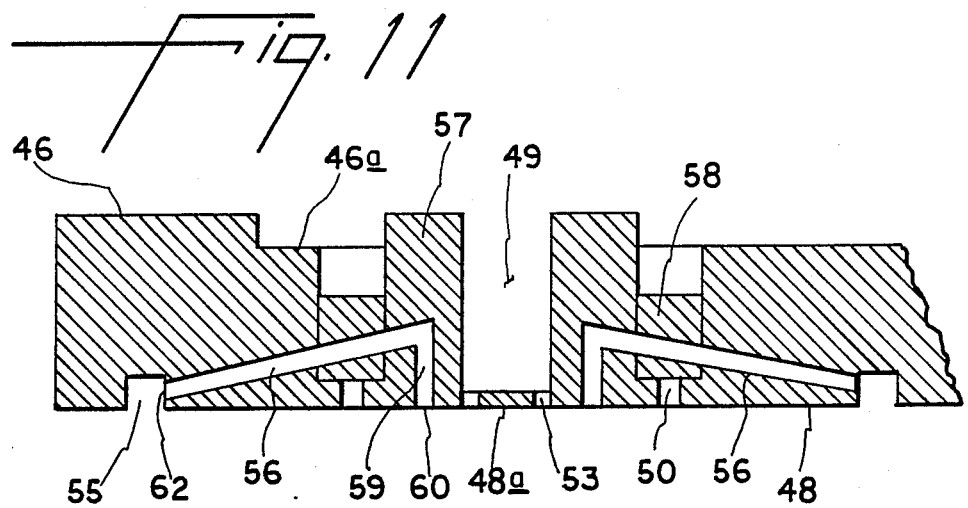
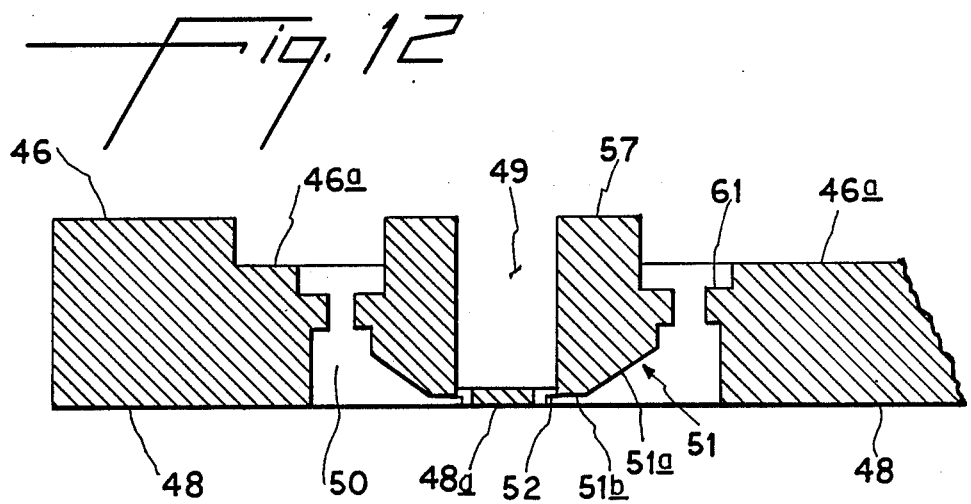
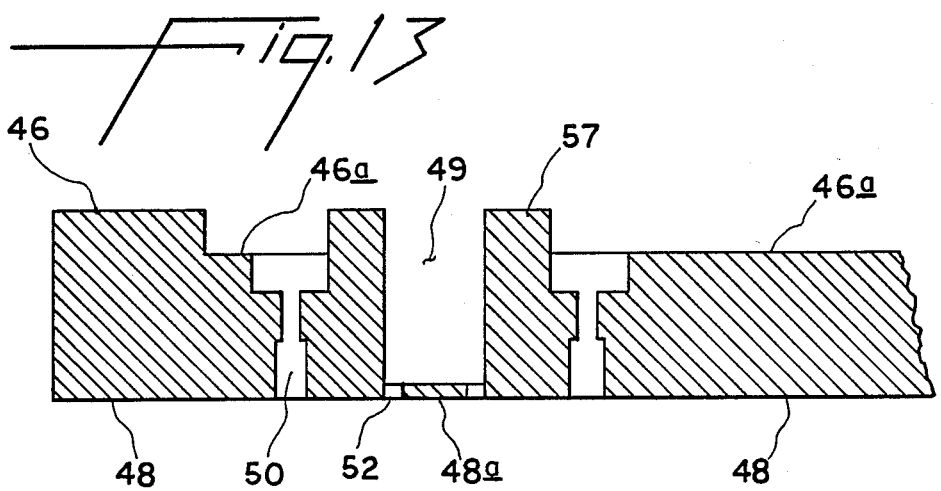

SPINNERET FOR PRODUCTION OF A HOLLOW FILAMENT WITHIN A HOLLOW FILAMENT COMPOSITE FIBER HAVING SPACING MEANS

CROSS-REFERENCE TO OTHER APPLICATION

The following application of common assignee contains some common disclosure and is believed to have an effective filing date identical to that of the present application: HOLLOW FIBERS HAVING CURVED SPACING MEMBERS PROJECTING THEREFROM AND SPINNERETS FOR THEIR PRODUCTION U.S. patent application Ser. No. 192,413 filed May 10, 1988, now U.S. Pat. No. 4,850,847.

BACKGROUND OF THE INVENTION

This invention relates to a hollow filament co-spun with a core within the hollow filament and spinnerets for co-spinning such filaments.

Hollow-fiber membrane bioreactors are known and have utility in the production of materials from suspended or immobilized enzymes or cell cultures. Cells or enzymes are located within or outside of the hollow fibers with reaction substrates being supplied to the cells or enzymes while desired products are removed. Due to the compact proportions of a bioreactor, known manual methods of manufacturing such membranes are costly and time consuming, particularly when dual hollow filaments of extended length and fine diameter are involved.

Hollow-within-hollow fibers have been described in U.S. patent application Ser. No. 879,571 of common assignee filed June 27, 1986, now U.S. Pat. No. 4,743,894. In these hollow-within-hollow fibers, the inner surface of the outer filament and the peripheral surface of the inner filament can touch along their length to a significant degree. This contact can decrease the effective area of filament surface exposed to fluids or materials located in the space between the filament.

Summary of the Invention

Hollow-within-hollow fibers are provided having means to keep the outer filament and the inner filament spaced from each other comprising spacing members projecting from the peripheral surface of the inner filament or from the inner surface of the outer filament and integral along the length thereof.

One spinneret for the production of fibers of this proposal includes a plate having upper and lower surfaces connected by a capillary, the capillary comprising a segmented annular inner passage for extrusion of an inner hollow filament therethrough, an annular outer passage concentric with the inner passage for extrusion of an outer hollow filament therethrough, and means associated with the outer passage to direct polymer toward the inner passage during polymer extrusion.

An alternate spinneret for the production of fibers of this proposal includes a plate having upper and lower surfaces connected by a capillary, the capillary comprising a segmented inner passage for extrusion of an inner hollow filament therethrough, an annular outer passage concentric with the inner passage for extrusion of an outer hollow filament therethrough, and means associated with the inner passage to direct polymer toward the outer passage during polymer extrusion. An inner passage of this alternate embodiment can comprise a plurality of segments, each segment comprising a first portion curved about the center of the capillary, a second portion extending in a straight line to the first portion, and a third portion extending from the second portion initially in a reverse curve direction with respect to the first portion.

In the above spinneret capillary embodiments, there can be provided a plurality of support members spanning the outer passage, and means for venting a gas into the capillary to a location between the inner and outer passage.

Additionally, the spinnerets used for co-spinning such filaments are of a one-piece design and do not suffer disadvantages of known prior art spinnerets which have been adapted to form hollow fibers.

BRIEF DESCRIPTION OF THE DRAWINGS

FIGS. 1-3 are side elevation, lower surface and upper surface views, respectively, of a spinneret of this proposal.

FIGS. 2A and 3A are enlarged views of a spinneret capillary viewed from the lower and upper surfaces, respectively, of the spinneret of FIG. 1.

FIGS. 4, 5, 6 are enlarged cross-sectional views of the capillary of FIG. 3A taken along lines 4—4, 5—5 and 6—6 of FIG. 3A, respectively.

FIG. 7 is an enlarged view of the inner segmented passage of FIG. 2A.

FIGS. 8-10 are side elevation, lower surface and upper surface views, respectively, of an alternate embodiment of the spinneret of this proposal.

FIGS. 9A and 10A are enlarged views of a spinneret capillary viewed from the lower and upper surfaces, respectively, of the spinneret of FIG. 8.

FIGS. 11, 12 and 13 are enlarged cross-sectional views of the capillary of FIG. 9A taken along lines 11—11, 12—12 and 13—13, respectively.

Detailed Description of the Preferred Embodiment

Figure 3A:
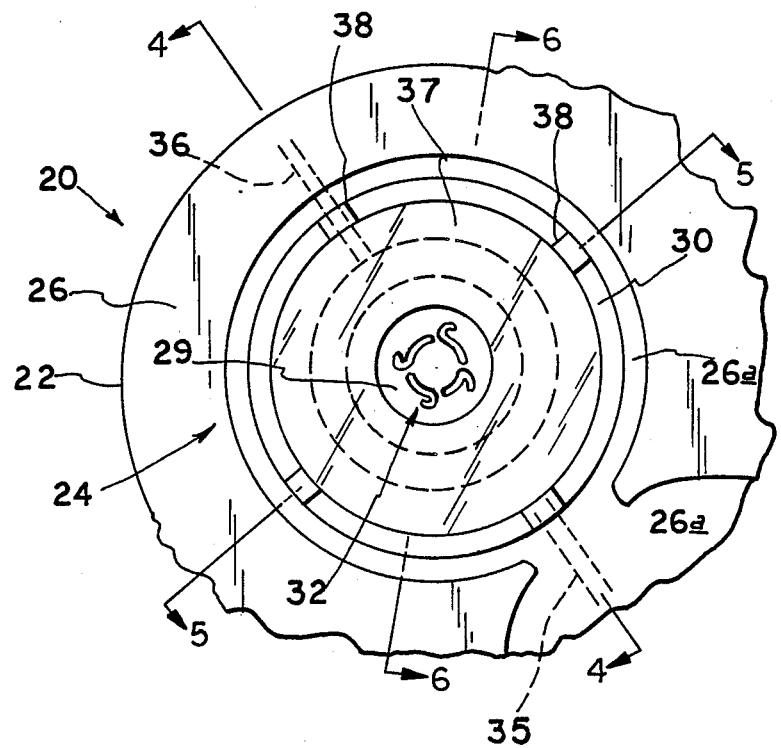

This invention minimizes contact between the separate inner and outer filament walls of hollow-within-hollow fibers. This contact can be minimized by incorporating into the hollow-within-hollow fiber structure means to keep the outer filament and the inner filament spaced from each other. These spacing means include spacing members projecting from the peripheral surface of the inner filament or from the inner surface of the outer filament and integral along the length thereof.

One spinneret for the production of fibers of this proposal includes a plate having upper and lower surfaces connected by a capillary, the capillary comprising a segmented annular inner passage for extrusion of an inner hollow filament therethrough, an annular outer passage concentric with the inner passage for extrusion of an outer hollow filament therethrough, and means associated with the outer passage to direct polymer toward the inner passage during polymer extrusion.

An alternate spinneret for the production of fibers of this proposal includes a plate having upper and lower surfaces connected by a capillary, the capillary comprising a segmented inner passage for extrusion of an inner hollow filament therethrough, an annular outer passage concentric with the inner passage for extrusion of an outer hollow filament therethrough, and means associated with the inner passage to direct polymer toward the outer passage during polymer extrusion. An inner passage of this alternate embodiment can comprise a plurality of segments, each segment comprising a first portion in the form of an arc curved with respect to the center of the capillary, a second portion extending in a straight line to the first portion, and a third portion extending from the second portion initially in a reverse curve direction with respect to the first portion.

In the above spinneret capillary embodiments, there can be provided a plurality of support members spanning the other passage, and means for venting a gas into the capillary to a location between the inner and outer passage.

Additionally, the spinnerets used for co-spinning such filaments are of a one-piece design and do not suffer disadvantages of known prior art spinnerets which have been adapted to form hollow fibers.

Referring now to FIGS. 1-4, spinneret 20 is adapted to be mounted in a filter pack for supplying one or more polymer compositions to be spun into the inner and outer filaments of a hollow-within-hollow fiber. The spinneret 20 is formed from plate 22 and is provided with a capillary 24, connecting its upper and lower surfaces 26, 28 respectively. Capillary 24 comprises an outer annular passage 30 concentric with segmented inner passage 32 and a venting passage 34 located between them. Support members 38 bridge annular passage 30 at angular locations to provide structural integrity to the spinneret. Bores 35, 36 are provided within plate 22 and pass through supports 38 to connect external openings 39, 40 to annular passage 34.

FIGS. 3 and 3A show recessed surface 26a in upper surface 26 and central bore 29.

FIGS. 2A and 7 show segmented inner passage 32 provided in lower plate section 28a through which polymer will be extruded to form the inner hollow filament of the fibers of this proposal. Inner passage 32 comprises three or more independent and curvate segments (shown as 32a, 32b, 32c, and 32d in FIG. 7) and separated by bridges 33. The segments comprise a first portion A in the form of an arc curved about the center C of the passage 32, a second portion K extending in a straight line from the first portion, and a third portion B extended from the second portion initially in a reverse curve direction with respect to the first portion.

Passage 32 is constructed in a spinneret face by selecting a center point C for the passage and a center point D for each of the segments to be formed; creating first portions A having an inner edge radius F and outer edge radius G from center point C; forming reverse curve portion B as arcs having inner edge radius I and outer edge radius H from center point D; and connecting portions A and B with a second portion in the form of a straight line K. The second portion K will preferably be tangential on one edge to the inner arc of portion A and to the outer arc of third portion B and will also be tangential on its outer edge to the outer edge of first portion A and the inner edge of third portion B. For radius lengths F, G, H, I, the difference in length between G and F will be equal to the difference in length between H and I. Additionally, if a line L is drawn through center points C and D, then the distance along line L from C to D will preferably be about equal to the length of H plus G where the length of G is preferably greater than or equal to the length of H. Segment B extends around center point D to a point defined with respect to line L. Segment B can be extended to meet line L or made shorter or longer which will then result in fibers formed therefrom having shorter or longer spacing members, respectively, from the suface thereof. If third portion B is continued past line L in an arc (e.g. 60 degrees), a hollow-shaped spacing member may be formed on the surface of a fiber.

Bridges 33 separate the segments of passage 32 and provide structural integrity to the inner section of the passage. The length of bridges 33 are defined by the distance E between a line E' extended parallel from the inside edge 70 of a segment of passage 32 and a second line E" drawn parallel to edge 70 and through segment corner 71. Typical values for the passage dimensions are given in the examples.

FIG. 4 is an enlarged side view through line 4—4 of FIG. 3A to show vent bores 35, 36 passing through supports 38 to provide venting gas to chamber 37. Groove 41 is provided for ease of manufacture of bore 35 and to provide an unobstructed flow of fluid to opening 39.

FIG. 5 shows support members 38 supporting chamber 37 and providing structural integrity to the spinneret at locations where bores 35, 36 are not present.

FIGS. 4 and 5 show lower surface segments 28a separated by passage 32; however, bridges 33 connect segments 28a at several locations on the lower surface of the spinneret as shown in FIG. 6 to complete the structural integrity of the spinneret.

Figure 14:
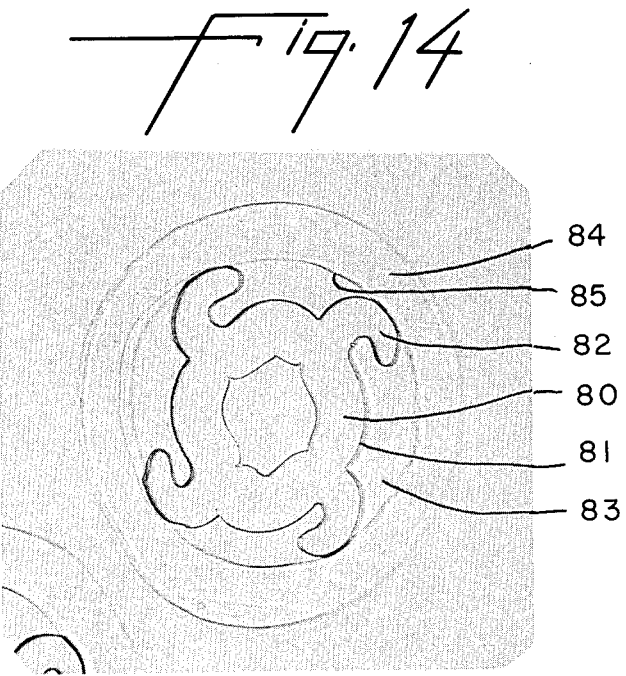
FIGS. 14 and 15 are photographs of cross-sectional views of the filaments of this invention (enlarged 250X and 135X, respectively).

FIG. 14 shows an enlarged cross-section of a fiber formed by the spinneret described above. Inner filament 80 has been co-spun within outer filament 84. Spacing members 82 project from the peripheral surface 81 of inner filament 80 and are available to contact the inner surface 85 of outer filament 84 and maintain space 83. The size of the outer filament 84 relative to inner filament 80 will determine the extent of the contact of spacing members 82 with the inner surface 85 of the outer filament 84.

In operation, a multiple feed distribution plate will provide polymer for the inner filament to bore 29 and polymer for the outer filament to recessed surface 26a. Polymer for the outer hollow filament will travel from recessed surface 26a to opening 30 where it will be extruded as a continuous hollow filament. Simultaneously, polymer for the inner hollow filament will be supplied to bore 29 and extruded through passage 32. The freshly extruded inner hollow filament will initially be discontinuous along its perimeter due to bridges 33; however, coalescence of the polymer occurs immediately after extrusion to form a continuous perimeter hollow filament. Portions B of passage 32 will form spacing members 82 during extrusion. A gas, for example, air, is supplied from passage 34 to maintain the space 83 between the inner and outer filament 80 and 84, repectively. Gas is supplied to passage 34 from chamber 37 which is fed from bores 35, 36 fed from openings 39, 40, respectively. A manifold (not shown) can be fit to the face of spinneret 20 to provide a positive gas pressure thereto for venting purposes.

FIGS. 8-13 illustrate an alternate embodiment of a spinneret of this proposal. Spinneret 43 is manufactured from plate 42 having lower and upper surfaces 48, 46 respectively. Capillary 44 extends through spinneret 43 and comprises an outer annular passage 50 having projections 51 directed inwardly therefrom and inner annular passage 52 interrupted by bridges 53. Vent openings 60 are located between outer passage 50 and inner passage 52 and communicates through bore 56 with openings 62 present in channel 55. Supports 58 bridge outer annular passage 50 to provide structural integrity to the spinneret. Bore 56 passes through bridges 58 to connect openings 62 and 60.

FIGS. 10 and 10A show recessed surface 46a in upper surface 46 and bore 49 communicating with segmented passage 52.

FIG. 11 is an enlarged cross-sectional view through 11—11 of FIG. 9A and shows bore 56 passing through support 58 and in communication with channel 55 through opening 62 and with cylindrical bore 59 which terminates at opening 60 in the lower surface 48 of capillary 44. FIG. 11 also shows bridges 53 in communication with the spinneret lower face segment 48a which maintain the structural integrity of the spinneret.

FIGS. 9A and 12 show channels 51 in lower surface 48 extending from the inner surface of annular passage 50 and defined by beveled edge 51a tapering toward the annular passage 52. The channels terminate in straight portion 51b before reaching the annular passage 52.

Figure 15:
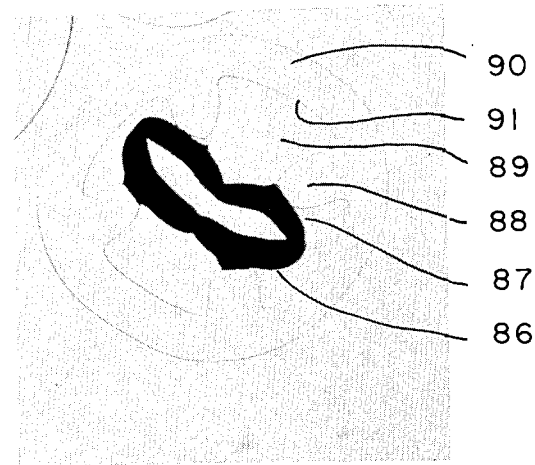

FIG. 15 shows filaments of this embodiment. An outer filament 90 contains spacing members 88 projecting inwardly from the inner surface 91 thereof and can contact the peripheral surface 87 of an inner hollow filament 86 to maintain a space 89 between the inner and outer filaments.

In operation, polymer which will form the outer hollow filament is supplied through a suitable distribution manifold to recessed surface 46a where it enters annular passage 50 and is extruded as a continuous hollow filament from the spinneret lower surface. As this polymer reaches the lower surface of the spinneret, it additionally enters channels 51 where it forms spacing members 88 projecting from the inner surface 91 of the outer hollow filament 90. Simultaneously, a polymer which will form the inner hollow filament is supplied by a suitable distribution manifold to bore 49 where it is subsequently extruded at the lower surface of the spinneret through passage 52. Due to bridges 53, the newly extruded filament is discontinuous along its perimeter; however, it immediately coalesces after extrusion to form a continuous hollow filament.

During co-extrusion of the inner and outer filaments, a gas, for example, air, is vented into the inter-filament space 89 through opening 60. Opening 60 is supplied from bore 56 which is fed from opening 62 in communication with channel 55. A manifold (not shown) can be fit to channel 55 to provide a positive gas pressure to opening 60 to maintain space 89 as the hollow-within-a-hollow fiber is formed.

EXAMPLES

Example 1

This example describes the co-spining of a hollow-within-hollow bicomponent fiber. The spinneret used was a spinneret of the type shown in FIGS. 1–7. The spinneret capillaries had the following dimensions:

outer polymer passage 30
    i.d. = 0.200 inch
    width = 0.007 inch
    depth = 0.040 inch inner polymer passage 32 (refer to FIG. 7)

-continued length G = 0.030 inch
length F = 0.0265 inch
length I = 0.0115 inch
length H = 0.015 inch
length E = 0.006 inch
length C–D = 0.045 inch The inner and outer hollow filaments were co-spun from polymethylpentene (Mitsui Petrochemicals (America), Ltd., transparent grade RT-18, melt flow rate=26 g/10 min., melt point=240°, density=0.833 g/cm$^3$) and polyethylene terephthalate (LRV=23.5), respectively. The two polymers were melted separately in heated zone screw melters to a temperature of about 270° C. and then extruded through the spinneret which was maintained at a temperature of about 270° C. The polymer forming the inner filament was metered at a rate of 2 g/min/passage and the polymer forming the outer filament was metered at a rate of 6 g/min/passage.

After the filaments were extruded from the spinneret, they were quenched with room temperature crossflow air and passed over a contact finish roll where a spin finish (a 10% solution of an alkylstearate ester lubricant emulsified with Aerosol® OT and Merpol® 1452) was applied to effect cohesion in the multi-filament bundle. The filaments were then brought together using convergence guides and wound-up onto a bobbin at 125 mpm. The filament was cut into thin sections and examined under light microscopy at a magnification of 250X and found to be a hollow-within-hollow fiber as shown in FIG. 14. The inner hollow filament 80 had support members 82 projecting therefrom in contact with the inner surface 85 of outer filament 84 maintaining a space 83 between the inner and outer filaments. The inner hollow filament was free from the outer filament and capable of being readily pulled out of the outer filament from one of its ends.

Example 2

This example describes the co-spinning of an alternate embodiment of this proposal wherein an electrically conductive hollow filament is co-spun within a hollow filament. The spinneret used was of the type shown in FIGS. 8–13. the spinneret capillaries had the following dimensions:

outer annular polymer passage 50
    o.d. = 0.200 inch
    width = 0.007 inch
    depth = 0.040 inch channel 51 width = 0.007 inch
channel 51 angle from face = 75 degrees inner polymer openings 52
    o.d. = 0.070 inch
    width = 0.004 inch
    depth = 0.017 inch length of bridge 53 along arc=0.009 inch The inner filament consisted of a mixture of electrically conductive carbon black in polyethylene 28% w/w and was co-spun with a polyethylene terephthalate (LRV=23.5) outer filament. The inner and outer filaments were melted separately in heated zone screw melters to a temperature of about 270° C. and extruded through the spinneret which was maintained at about 270° C. The carbon black/polyethylene polymer forming the inner filament was metered at a rate of about 0.7 g/min/passage and the polymer forming the outer filament was metered at a rate of 4 g/min/passage.

After the filament was extruded from the spinneret, it was quenched with water and wound-up onto a bobbin at 50 mpm. The filament was cross-sectioned and then examined using light microscopy at a magnification of 135X and found to be a hollow-within-hollow filament as shown in FIG. 15. The outer filament 90 had spacing members 88 projecting from the inner surface 91 thereof to contact the peripheral surface 87 of inner filament 86 and maintain space 89 between the inner and outer filaments.

I claim:

1. A spinneret for the production from first and second non-adhering molten polymers of a hollow filament containing within itself a co-spun filament comprising: a plate having upper and lower surfaces connected by a capillary, said capillary comprising an inner annular passage through which said first molten polymer passes and an outer annular passage concentric with the inner annular passage through which said second molten polymer passes; and a plurality of channels in said lower surface leading from said outer annular passage toward said inner annular passage, each channel having a beveled edge followed by a straight portion, said straight portion being in communication with said inner annular passage.

2. The spinneret as defined in claim 1, each channel terminating at said inner annular passage.

3. A spinneret for the production from first and second non-adhering molten polymers of a hollow filament containing within itself a co-spun filament comprising: a plate having upper and lower surfaces connected by a capillary, said capillary comprising an inner segmented passage through which said first molten polymer passes and an outer annular passage concentric with the inner segmented passage through which said second molten polymer passes; said inner segmented passage having a center point each segment of said inner segmented passage comprises a first portion in the form of an arc curved about the center point of the inner segmented passage, a second portion extending in a straight length from said first portion and connected to a third portion, said third portion being in the form of a reverse curve with respect to said first portion.

4. The spinneret of claim 3 wherein said second portion extends in a straight length tangent to said first and third portions.

* * * * *